United States Patent [19]

Zaunberger

[11] 4,428,445

[45] Jan. 31, 1984

[54] TRACKED VEHICLE DRIVE ASSEMBLY

[75] Inventor: Franz X. Zaunberger, Augsburg, Fed. Rep. of Germany

[73] Assignee: Zahnraderfabrik Renk A.G., Augsburg, Fed. Rep. of Germany

[21] Appl. No.: 283,629

[22] Filed: Jul. 15, 1981

[30] Foreign Application Priority Data

Sep. 16, 1980 [DE] Fed. Rep. of Germany ....... 3034816

[51] Int. Cl.³ ............................................. B62D 11/16
[52] U.S. Cl. .................................... 180/6.44; 74/664; 74/665 L
[58] Field of Search ....................... 180/6.44, 6.3, 301, 180/333, 335; 74/664, 665 L, 665 M

[56] References Cited

U.S. PATENT DOCUMENTS

| 1,991,094 | 2/1935 | Higley | 180/6.44 |
| 3,357,509 | 12/1967 | Gustafsson et al. | 180/6.44 |
| 3,498,057 | 3/1970 | Kronograd et al. | 74/665 L |

FOREIGN PATENT DOCUMENTS

| 8596 | of 1897 | United Kingdom | 180/333 |
| 1078627 | 8/1967 | United Kingdom | 180/6.44 |
| 1155867 | 6/1969 | United Kingdom . | |
| 1526542 | 9/1978 | United Kingdom . | |
| 1547298 | 6/1979 | United Kingdom . | |

Primary Examiner—John A. Pekar
Assistant Examiner—D. Lynn Fugate
Attorney, Agent, or Firm—Natter & Natter

[57] ABSTRACT

A drive assembly for tracked vehicles includes a gas turbine engine with separate turbine shafts driving a vehicle propulsion speed change gear box and a steering unit. In one embodiment, the gear box is driven by a working turbine wheel output shaft while an infinitely variable steering unit is driven by a turbine compressor shaft. In an alternate embodiment, the steering unit comprises a reversing gear driving a zero shaft and with the steering unit being driven by a separate stage turbine wheel having adjustable nozzles or vanes. A further embodiment permits the elimination of the reversing gear in the steering unit by providing adjustable turbine vanes and/or blades which are capable of reversing the direction of rotation of the wheel which drives the steering unit shaft. In some embodiments, auxiliary steering power is provided in the event of an engine failure through a power takeoff from the working turbine shaft.

10 Claims, 5 Drawing Figures

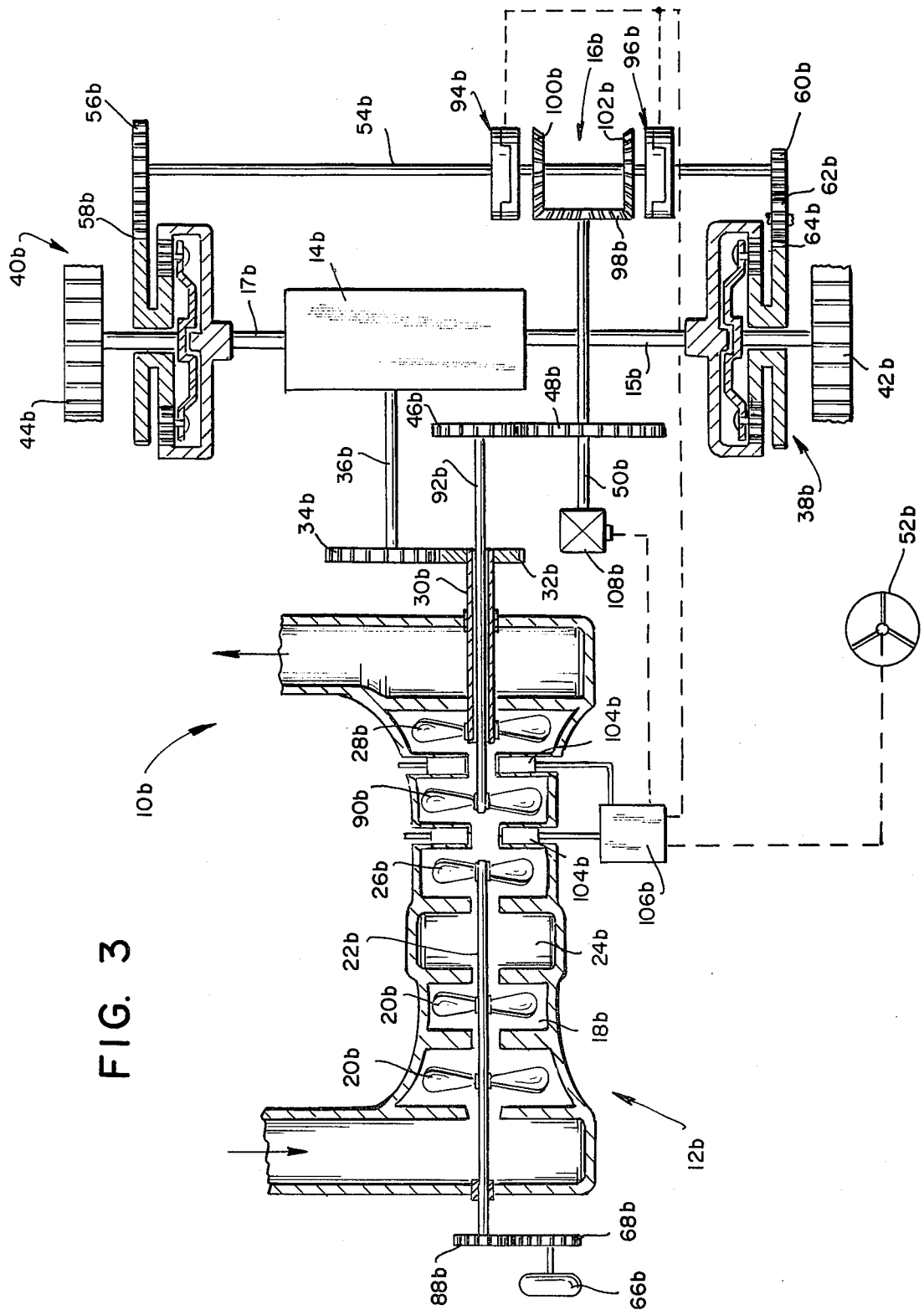

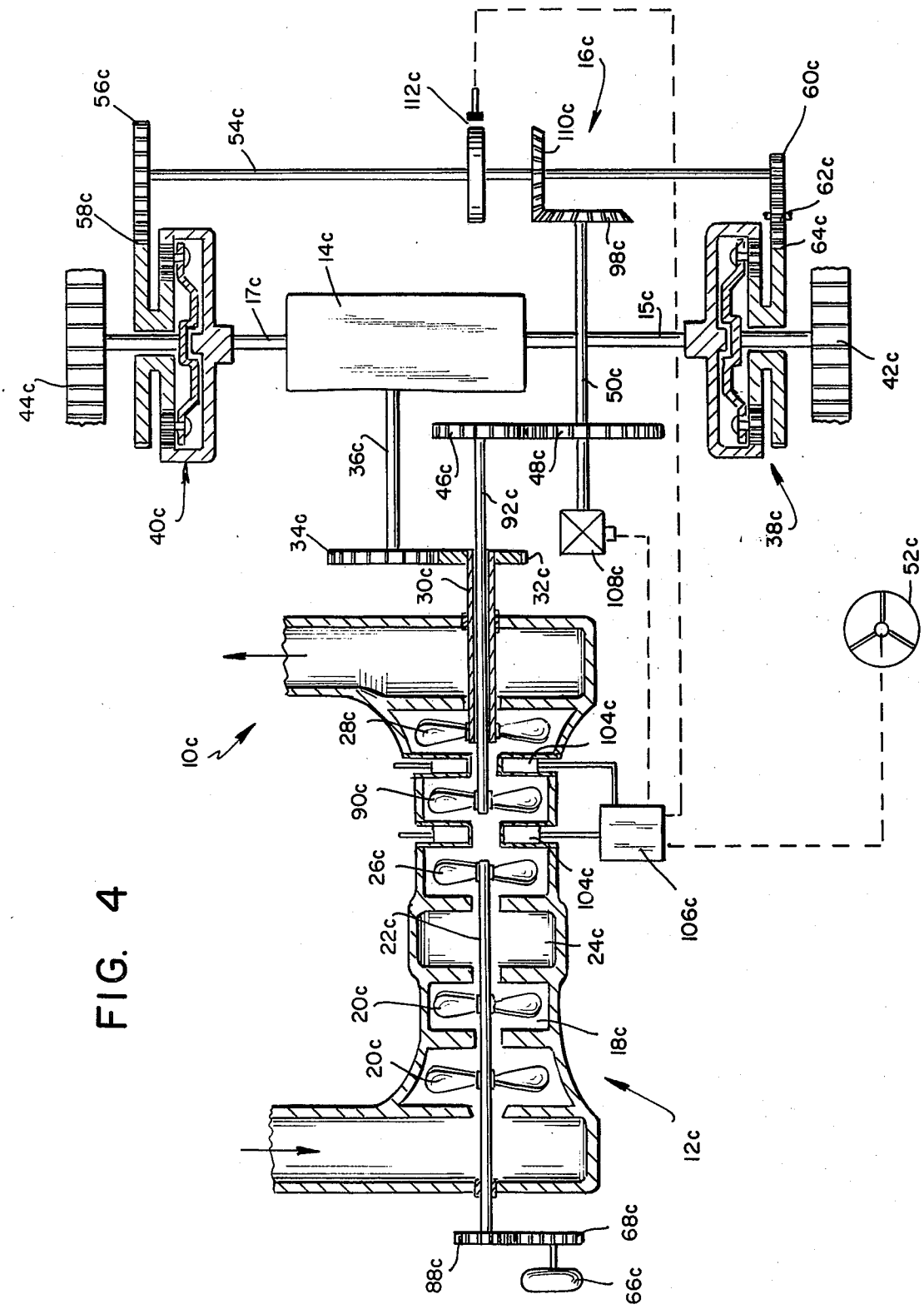

TRACKED VEHICLE DRIVE ASSEMBLY

BACKGROUND OF THE INVENTION

1. Field of the Invention

The present invention relates generally to power transmission in tracked vehicles such as tanks and more specifically to an improved drive assembly for powering a steering unit and a vehicle propulsion gear box.

2. Brief Description of the Prior Art

Drive assemblies for tracked vehicles having a hydrodynamic-mechanical speed change gear box for vehicle propulsion, i.e. travelling drive, and with an infinitely variable superimposed steering unit have been disclosed in the following patents: Federal Republic of Germany Pat. No. 1,480,725 (corresponding to United Kingdom Pat. No. 1,155,867) and Federal Republic of Germany application No. 2,521,331 (corresponding to United Kingdom Pat. No. 1,526,542). The vehicle engines which drove such assemblies were either diesel or multiple shaft gas turbines with the working turbine wheel shaft separate from the gas compressor stage.

The infinitely variable steering unit was preferably driven from the primary side of a hydrodyanmic converter while the speed change gear box (for vehicle propulsion) was driven from the secondary side of the converter. The slip provided by the hydrodynamic converter permitted the steering unit to achieve practically full driving speed in the starting state, with the secondary side of the converter rotating slowly or not rotating at all.

The employment of hydrodynamic converters for power distribution between the speed change gear box and the steering unit presented certain disadvantages. Initially, the hydrodynamic converter increased the size, weight and cost of the drive assembly. In addition, the converter provided a component in the drive assembly which was a potential source of malfunction.

SUMMARY OF THE INVENTION

The present invention relates to a drive assembly for a tracked vehicle which powers both a vehicle propulsion speed change gear box and a vehicle steering unit from a multiple shaft gas turbine engine without requiring an intermediate hydrodynamic converter. The speed change gear box is coupled to an output shaft of a working turbine wheel while the steering unit is coupled to and driven from a different shaft connected to a turbine wheel which rotates independently of the working wheel. As such, full power may be applied to the steering unit while the output shaft which drives the gear box is stopped or rotating slowly such as occurs when the vehicle is starting.

In one embodiment, an infinitely variable superimposed steering unit is driven from a turbine compressor shaft while the gear box is driven from the working output shaft. In a further embodiment, a simplified steering unit which includes a reversing gear driving a zero shaft is coupled to an output shaft of an independent turbine stage. The speed of the wheel which drives the steering unit output shaft is variable as a function of a steering control through an adjustable turbine vane or nozzle assembly.

In a further embodiment, the turbine vanes and/or blades are capable of reversing the direction of rotation of the turbine wheel which drives the steering unit shaft and the steering unit itself comprises a bevel gear linkage to a zero shaft.

From the foregoing compendium, it will be appreciated that it is an object of the present invention to provide a tracked vehicle drive assembly of the general character described which is not subject to the disadvantages of the prior art as aforementioned.

Another object of the present invention is to provide a tracked vehicle drive assembly of the general character described which is simple in construction and efficient in operation.

A further object of the present invention is to provide a tracked vehicle drive assembly of the general character described which is low in cost as compared to drive assemblies of the prior art.

Yet another object of the present invention is to provide a tracked vehicle drive assembly of the general character described which interconnects an engine to both a vehicle propulsion gear box and a vehicle steering unit without the employment of a hydrodynamic converter.

A still further object of the present invention is to provide a tracked vehicle drive assembly of the general character described which permits limited or no driving of a vehicle speed change gear box with maximum operating speed employed at a steering unit and without the employment of a hydrodynamic converter.

Another object of the present invention is to provide a tracked vehicle drive assembly of the general character described which interconnects a multiple shaft gas turbine engine directly to a vehicle propulsion speed change gear box and a steering unit.

Other objects of the invention in part will be obvious and in part will be pointed out hereinafter.

With these ends in view, the invention finds embodiment in certain combinations of elements, arrangements of parts and series of steps by which the said objects and certain other objects are hereinafter attained, all as more fully described with reference to the accompanying drawings and the scope of which is more particularly pointed out and indicated in the appended claims.

BRIEF DESCRIPTION OF THE DRAWINGS

In the accompanying drawings in which are shown some of the various possible exemplary embodiments of the invention:

FIG. 3 is a schematized block diagram of a tracked vehicle drive assembly constructed in accordance with a further embodiment of the invention wherein a simplified steering unit is provided in conjunction with a steering control which varies turbine wheel speed; and FIG. 4 is a schematized block diagram of a tracked vehicle drive assembly constructed in accordance with a further embodiment of the invention and wherein a steering control controls both the speed and direction of a turbine wheel which powers the steering unit.

DESCRIPTION OF THE PREFERRED EMBODIMENTS

Figure 1:
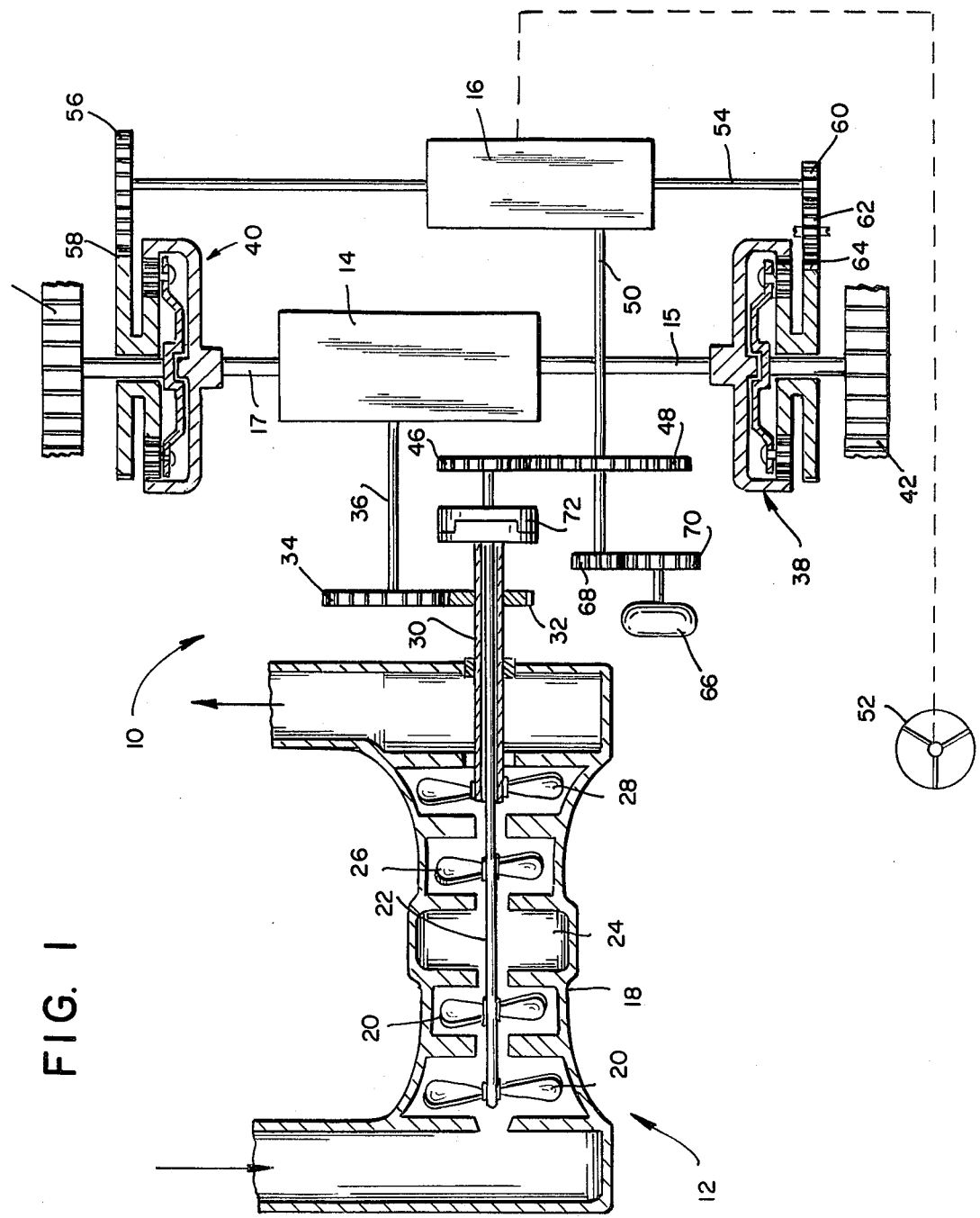
FIG. 1 is a schematized block diagram of a tracked vehicle drive assembly constructed in accordance with and embodying the invention and showing the drive assembly interconnecting a multiple shaft gas turbine engine with a vehicle propulsion gear box and an infinitely variable steering unit and with the gear box being driven from a working turbine shaft while the steering unit is driven from a turbine compressor shaft.
Figure 1A:
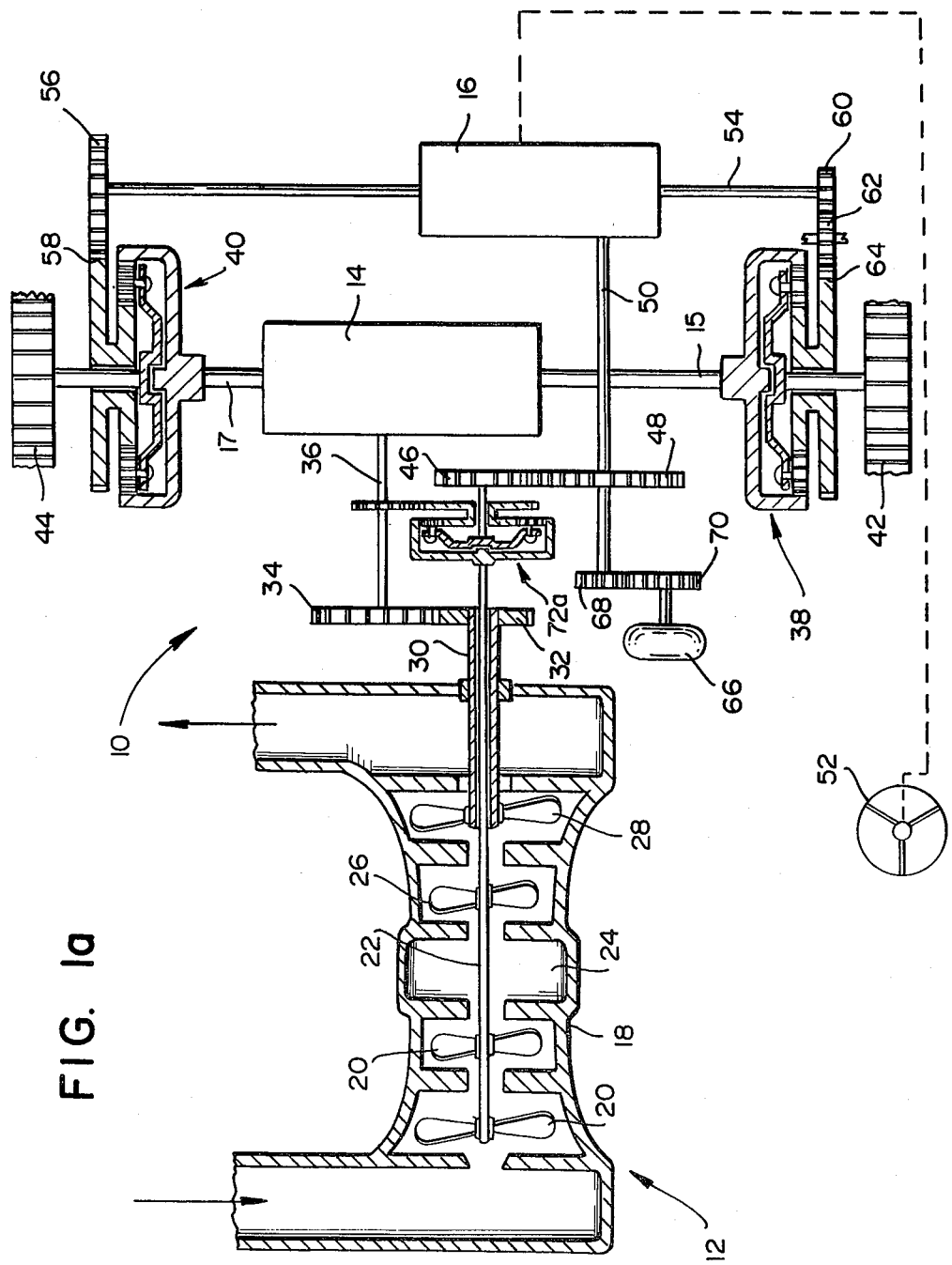
FIG. 1a is a schematized block diagram similar to that of FIG. 1 wherein the turbine compressor shaft and the working turbine shaft are interconnected by a planetary gear set (constantly acting summation-differential gear) in lieu of a clutch as illustrated in FIG. 1.

Referring now in detail to the drawings, the reference numeral 10 denotes generally a tracked vehicle drive assembly constructed in accordance with and embodying the present invention. The drive assembly 10 interconnects a vehicle engine 12 comprising a multiple shaft gas turbine engine with a vehicle speed change gear box 14 and an infinitely variable steering unit 16.

The turbine engine 12 includes a compressor stage 18 having a plurality of bladed compressor wheels 20 mounted to a common compressor shaft 22. The compressor shaft 22 additionally includes a power wheel 26 positioned downstream from a combustion chamber 24. The power wheel 26 rotates the compressor shaft 22 and the compressor wheels 20. In addition, the turbine engine 12 includes one or more working turbine wheels 28 mounted to an output shaft 30. It will be observed that the working wheel 28 and the output shaft 30 operate independently of the power wheel 26 and the compressor shaft 22.

To power the speed change gear box 14 for vehicle propulsion, a pinion 32 fixed to the ouput shaft 30 drives a spur gear 34 which is fixed to an input shaft 36 of the gear box 14. The gear box 14 includes a pair of opposed output shafts 15, 17 each of which drives an annulus of a planetary gear set 38, 40. A sprocket 42, 44 is driven from the cages of the gear sets 38, 40 respectively with each sprocket driving one of the vehicle chains or tracks.

In order to power the steering unit 16 from the compressor shaft 22 pursuant to the teaching of the present invention, a pinion 46 fixed to the compressor shaft 22 engages a spur gear 48. The gear 48 is fixed to an input shaft 50 of the infinitely variable superimposed steering unit 16. The steering unit input shaft 50 thus operates independently of the turbine output shaft 30.

Suitable steering units 16 may comprise any of the readily available conventional types such as a hydrostatic drive with a variable delivery pump and an oil motor or a hydrostatic-hydrodynamic drive. Vehicle steering is achieved by an operator engageable steering control 52 such as a wheel, rod or lever in a conventional manner.

The steering unit 16 includes a zero or neutral shaft 54 having a pinion 56 at one end which engages a sun gear 58 of the planetary gear set 40. At its opposite end, the zero shaft 50 includes a pinion 60 which engages a spur gear 62 which in turn is in engagement with a sun gear 64 of the planetary gear set 38.

An oil feed pump 66 which may be employed for transmission lubrication purposes is powered by the turbine compressor shaft 22 through a pinion 68 fixed to the steering input shaft 50. The pinion 68 engages a spur gear 70 fixed to the oil pump input shaft.

In operation, power generated by the compressor power wheel 26 drives the compressor wheels 20 and the compressor shaft 22. From the compressor shaft 22, both the steering unit 16 and the oil feed lubrication pump 66 are driven. The speed change gear box 14 (for vehicle propulsion) is driven from power generated by the working turbine wheel 28 which causes the output shaft 30 to rotate.

In accordance with this arrangement, full power and speed may be provided for operation of the steering unit 16 even while the working turbine wheel 28 is in the starting state or rotating at a low speed. Since the lubrication pump 66 is also driven from the compressor shaft, pressure and lubricant supply are insured in such instances.

In the event of an engine failure, vehicle steerability is maintained through an auxiliary coupling which comprises a clutch 72 for selectively interconnecting the turbine output shaft 30 and the compressor shaft 22. With an engine failure occurring during vehicle motion, the moving vehicle inertia will rotate the turbine output shaft 30 through the gear box 14, the gear box input shaft 36 and the gears 34, 32. Once the clutch is engaged, the steering unit 16 and the oil pump 66 will be driven from the output shaft 30. In lieu of the clutch 72, the auxiliary interconnection may comprise a constantly acting summation-differential gear.

Figure 2:
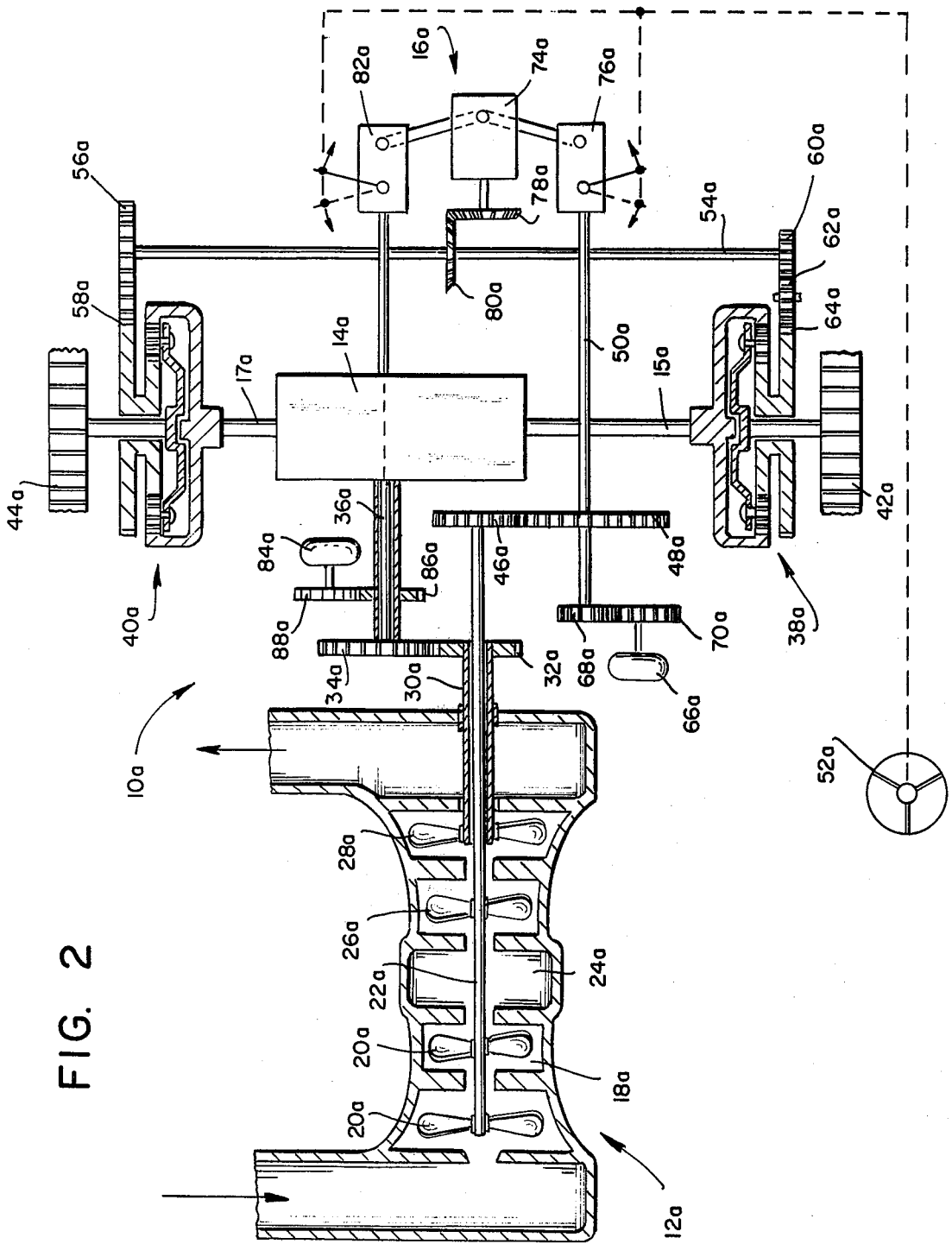
FIG. 2 is a schematized block diagram of an alternate embodiment wherein the steering unit comprises an oil pump driven by the compressor shaft and driving an oil motor and with an auxiliary oil pump being provided to drive the oil motor in the event of engine failure.

Referring now to FIG. 2 wherein an alternate embodiment of the invention is illustrated, like numerals bearing the suffix "a" have been employed to denote components corresponding to those of the embodiment previously described. In this embodiment of a drive assembly 10a, a turbine 12a identical to that of the previous embodiment is employed as the vehicle engine. A steering unit 16a of modified construction, however, is employed. The steering unit 16a comprises an oil motor 74a which is driven by a variable delivery oil pump 76a. Normal operation of the steering unit 16a is powered by a compressor shaft 22a of the turbine engine 12a which drives an input shaft 50a of the delivery oil pump 76a through a gearing arrangement comprising a pinion 46a and a spur gear 48a.

A bevel gear 78a fixed to the output shaft of the oil motor 74a engages a further bevel gear 80a fixed to a zero shaft 54a. The speed and direction of rotation of the oil motor 74a, hence the zero shaft 54a, is determined by the position of a steering control 52a which engages a control lever of the oil pump 76a.

A turbine output shaft 30a driven by a working turbine wheel 28a is employed to power a gear box 14a through a pinion 32a fixed to the output shaft 30a. The pinion 32a engages a spur gear 34a fixed to a gear box input shaft 36a. The gear box input shaft 36a also serves to drive an auxiliary variable delivery oil pump 82a which provides auxiliary power for the steering unit oil motor 74a. The variable delivery oil pump is also controlled by the steering control 52a.

In addition, a further oil feed pump 84a is provided. The oil feed pump 84a is driven from the turbine output shaft 30a through the spur gear 34a which includes a sleeve concentric with the input shaft 36a. The sleeve carries a pinion 86a in driving engagement with a spur gear 88a on an input shaft of the oil feed pump 84a. The oil feed pump 84a is an auxiliary pump for lubricating oil supply in the event of engine failure. Under normal engine operation, lubricating oil is supplied through an oil feed pump 66a driven from the compressor shaft 22a in a manner identical to that of the oil feed pump 66 of the previous embodiment.

In lieu of a hydrostatic steering mechanism, the steering unit 16a may be electrically operated with the motor 74a comprising an electric motor. The input shaft 50a then drives a generator 76a, and the input shaft 36a drives a generator 82a.

During normal engine operation, the steering unit 16a is powered through the compressor shaft 22a which drives a gear train 46a, 48a and 50a. Upon failure of the turbine engine 12a while the vehicle is in motion, steerability is maintained through the oil pump 82a which will then drive the oil motor 74a and which is powered through vehicle inertia driving the speed change gear box input shaft 36a. Upon such occurrence, the auxiliary oil feed pump 84a will be operative for lubrication purposes.

In some instances during normal engine operation with the vehicle travelling, it is desirable to drive the motor 74a from both the oil pump or generator 76a and the oil pump or generator 82a.

A further embodiment of a drive assembly 10b is illustrated in FIG. 3 wherein like numerals denote like components of the embodiments previously described, however, bearing the suffix "b". In this embodiment, an alternate turbine arrangement is provided. A turbine engine 12b includes two working turbine shafts and a compressor shaft.

Vehicle propulsion power is obtained through a working turbine wheel 28b fixed to an output shaft 30b. A pair of gears 32b, 34b is driven by the output shaft 30b and drives an input shaft 36b of a speed change gear box 14b.

A lubrication oil feed pump 66b is driven from a compressor shaft 22b through a pinion 88b which engages a spur gear 68b on the pump shaft.

A steering turbine wheel 90b is provided in the turbine engine 12b, preferably positioned upstream of the working turbine wheel 28b. The turbine wheel 90b drives an output shaft 92b for independently powering a steering unit 16b. A pair of gears 46b, 48b interconnects the output shaft 92b with a steering unit input shaft 50b.

In lieu of providing an infinitely variable steering unit such as the steering units 16, 16a, a simplified steering unit 16b is provided. The steering unit 16b comprises a reversing gear formed of a pair of opposed clutches 94b, 96b, the secondary parts of which are fixed to a zero shaft 54b. The primary part of each clutch rotates in opposite directions, driven by the steering input shaft 50b. The input shaft 50b includes a bevel gear 98b which engages a bevel gear 100b on the primary part of the clutch 94b and a bevel gear 102b on the primary part of the clutch 96b. The direction of rotation of the zero shaft 54b will be dependent upon which clutch 94b or 96b is engaged while the zero shaft 54b will be fixed when both clutches are engaged.

The speed of rotation of the zero shaft 54b is variable in response to the position of a steering control 52b which controls the speed of rotation of the turbine wheel 90b. This is achieved by providing adjustable turbine nozzles or vanes 104b for directing the jets of gas which impinge upon the blades of the wheel 90b.

A turbine vane adjusting apparatus of conventional construction 106b is provided for this purpose. The adjusting apparatus receives signals indicative of the speed of the steering input shaft 50b from a speed sensor unit 108b which operatively engages the shaft 50b. The adjusting mechanism controls the vanes 104b, 106b through conventional control lines.

In operation, vehicle drive in a straight line is stabilized by engaging both clutches 94b, 96b. For turning in either direction, a selected clutch is engaged while the other clutch is disengaged. The radius of the turn is controlled by adjusting the speed of rotation of the zero shaft 54b which is achieved by adjustment of the speed of rotation of the turbine wheel 90b. This is accomplished by adjusting the turbine vanes responsive to the position of the steering control 52b.

A further embodiment of the present invention is illustrated in FIG. 4 wherein like numerals denote components corresponding to those of the embodiments previously described, however, bearing the suffix "c". A drive assembly 10c of this embodiment is similar in construction to that of the embodiment of FIG. 3 and includes a multiple shaft turbine engine 12c having a compressor shaft 22c. The shaft 22c drives a pair of compressor wheels 20c as well as a lubricating oil delivery pump 66c.

The turbine engine 12c additionally includes a working wheel 28c which drives a speed change gear box 14c through an output shaft 30c and gearing in a manner identical to that of the embodiment of FIG. 3. In addition, a turbine wheel 90c drives an output shaft 92c which engages a steering input shaft 50c through a pair of gears 46c, 48c. The steering input shaft 50c drives a zero shaft 54c of a steering unit 16c. For this purpose, a bevel bear 98c is provided on the input shaft 50c while a further bevel gear 110c in engagement with the bevel gear 98c is provided on the zero shaft 54c. The zero shaft may be stopped by actuation of a brake assembly 112c.

This embodiment differs from the embodiment of FIG. 3 with respect to the extent of control over the turbine wheel 90c. In this embodiment, a plurality of nozzles or vanes 104c can be adjusted to vary not only the speed of rotation of the turbine wheel 90c but also its direction. This is achieved by shifting the adjustable vanes 104c, the turbine nozzels and/or the blades of the turbine wheel 90c. By also adjusting the vanes and/or blades of the working wheel 28c, controlled turbine power can be selectively transmitted as needed, either partly or fully, to the speed change gear box 14c and to the steering unit 16c. For example, maximum power input to the steering unit 16c may require a reduction of power input to the speed change gear box 14c.

Because the turbine wheel 90c can reverse its direction of rotation, the clutched reversing drive as previously employed for engaging the zero shaft is not needed and the simple bevel gear arrangement 98c, 110c has been provided.

In a manner similar to that described with reference to the embodiment of FIG. 3, control over the turbine wheel 90c is provided through an adjusting mechanism 106c which controls the vanes 104c as well as the turbine blades. In addition, the mechanism 106c controls the brake 112c. The mechanism 106c receives control signals from a steering control 52c as well as a speed sensor 108c.

In operation, the radius of turn can be controlled by adjusting the speed of the turbine wheel 90c in both directions of rotation while straight driving is stabilizing through application of the brake 112c.

In the event of engine failure, steerability of the vehicle is maintained in the embodiments illustrated in FIGS. 3 and 4 in accordance with United Kingdom Pat. No. 1,547,298 (corresponding to German patent DOS No. 25 37 229) which is incorporated herein by reference.

Thus, it will be seen that there is provided a tracked vehicle drive assembly which achieves the various objects of the invention and which is well suited to meet the conditions of practical usage.

As various changes might be made in the tracked vehicle drive assembly as above set forth, it is to be understood that all matter herein described or shown in the accompanying drawings is to be interpreted as illustrative and not in a limiting sense.

Having thus described the invention, there is claimed as new and desired to be secured by Letters Patent:

1. A drive assembly for a tracked vehicle having gearing means for propulsion of the vehicle and a steering unit for steering the vehicle, the drive assembly comprising a multiple shaft gas turbine engine, the engine including a working wheel output shaft and a compressor shaft, power input means for operatively interconnecting the gearing means to the engine working wheel output shaft and power input means for permanently interconnecting the steering unit to the compressor shaft and means for selectively drivingly interconnecting the steering unit and the output shaft, the steering unit being driven solely by the compressor shaft during normal engine operation, the steering unit and output shaft interconnecting means being selectively engageable for continued steerability when the engine fails and the gearing means drives the output shaft through vehicle inertia whereby the steering unit will be driven for continued vehicle control.

2. A drive assembly for a tracked vehicle constructed in accordance with claim 1 wherein the means for interconnecting the steering unit and the output shaft comprises a clutch.

3. A drive assembly for a tracked vehicle constructed in accordance with claim 1 wherein the means for interconnecting the steering unit and the output shaft comprises a summation differential gear.

4. A drive assembly for a tracked vehicle constructed in accordance with claim 1 wherein the steering unit comprises an oil motor, the power input means for interconnecting the steering unit to the compressor shaft comprises an oil pump and the steering unit and output shaft interconnecting means comprises a further oil pump.

5. A drive assembly for a tracked vehicle constructed in accordance with claim 1 wherein the steering unit comprises an electric motor, the power input means interconnecting the steering unit to the compressor shaft comprises a generator and the steering unit and output shaft interconnecting means comprises a further generator.

6. A drive assembly for a tracked vehicle having gearing means for propulsion of the vehicle and a steering unit for steering the vehicle, the drive assembly comprising a multiple shaft gas turbine engine having a pair of shafts, means for operatively interconnecting the gearing means to one shaft and means for permanently interconnecting the steering unit to the other shaft, a different turbine wheel fixed to and driving each of the shafts, and means for selectively drivingly interconnecting the steering unit and the one shaft, the steering unit being driven solely by the other shaft during normal engine operation, the steering unit and one shaft interconnecting means being selectively engageable for continued vehicle steerability when the engine fails and the gearing means drives the one shaft through vehicle inertia.

7. A drive assembly for a tracked vehicle having gearing means for propulsion of the vehicle and a steering unit for steering the vehicle, the drive assembly comprising a multiple shaft gas turbine engine, the engine including a pair of shafts, means for operatively interconnecting the gearing means to one shaft and means for operatively interconnecting the steering unit to another shaft, the steering unit comprising an oil motor, the means operatively interconnecting the steering unit to the other engine shaft comprising an oil pump and means operatively connecting the oil pump to the other shaft, the steering unit further including a zero shaft and means interconnecting the oil motor with the zero shaft, the drive assembly further including means for selectively drivingly interconnecting the oil motor with the one shaft, the selectively interconnecting means comprising a further oil pump and means operatively connecting the further oil pump to the one shaft, the further oil pump selectively driving the oil motor for continued steerability when the engine fails and the gearing means drives the output shaft through vehicle inertia.

8. A drive assembly for a tracked vehicle having a multiple shaft gas turbine engine, a propulsion transmission operatively driven by a first working turbine of the engine, a superimposed steering gear unit operatively driven by a second working turbine of the engine, an operator engaged positionable steering control, turbine speed sensing means and means for adjusting the speed of one of the working turbines in response to the operator determined position of the steering control, the sensing means sensing the speed of the one turbine and means operatively interconnecting the sensing means and the adjusting means, whereby the power required by the steering gear for steering the vehicle through a turn is automatically controlled as a function of the steering control.

9. A drive assembly constructed in accordance with claim 8 wherein the means for adjusting the speed of the one turbine includes means for adjusting such speed in both a forward and reverse direction of rotation.

10. A drive assembly constructed in accordance with claim 8 wherein both of the working turbines are constructed to generate optimized power output, the one turbine comprising the second turbine, the adjusting means further including means for adjusting the first turbine which drives the propulsion transmission, the first turbine adjusting means including means for reducing the power of the first turbine to thereby increase the power of the second turbine whereby intermittent high power requirements of the steering unit can be accommodated.

* * * * *